United States Patent
Jacob et al.

(10) Patent No.: US 9,834,095 B2
(45) Date of Patent: Dec. 5, 2017

(54) FLUID SPRAYING SYSTEM AND METHOD FOR A MASS TRANSIT VEHICLE

(71) Applicant: Bombardier Transportation GmbH, Berlin (DE)

(72) Inventors: Richard Jacob, Mont-St-Hilaire (CA); Christian Girard, Carignan (CA)

(73) Assignee: Bombardier Transportation GmbH, Berlin (DE)

( * ) Notice: Subject to any disclaimer, the term of this patent is extended or adjusted under 35 U.S.C. 154(b) by 77 days.

(21) Appl. No.: 14/970,964

(22) Filed: Dec. 16, 2015

(65) Prior Publication Data

US 2017/0174084 A1 Jun. 22, 2017

(51) Int. Cl.
  *B60L 5/00* (2006.01)
  *B60L 5/02* (2006.01)
  *B60L 5/39* (2006.01)

(52) U.S. Cl.
  CPC .. *B60L 5/02* (2013.01); *B60L 5/39* (2013.01)

(58) Field of Classification Search
  CPC ..................................... B61L 5/02; B61L 5/39
  See application file for complete search history.

(56) References Cited

U.S. PATENT DOCUMENTS

| | | | | |
|---|---|---|---|---|
| 1,788,572 A | * | 1/1931 | Goodman | B60L 5/39 191/49 |
| 3,263,075 A | * | 7/1966 | Hill | B61K 3/00 104/279 |
| 3,835,269 A | * | 9/1974 | Levin | B60L 5/02 191/62 |
| 4,101,014 A | * | 7/1978 | Matheson | B60L 5/02 104/279 |
| 4,848,510 A | * | 7/1989 | Ahmed | B60C 27/00 180/309 |
| 4,932,618 A | * | 6/1990 | Davenport | B61L 23/042 180/169 |

(Continued)

FOREIGN PATENT DOCUMENTS

| | | |
|---|---|---|
| CN | 201261472 Y | 6/2009 |
| CN | 201419716 Y | 3/2010 |

(Continued)

OTHER PUBLICATIONS

Arrowvale Electronics, "Rail De-Icing Equipment", http://arrowvale.co.uk/rail/de-icing-equipment, printed Nov. 9, 2015.

*Primary Examiner* — Jason C Smith
(74) *Attorney, Agent, or Firm* — The Webb Law Firm (57) ABSTRACT

In an apparatus and method of automatically providing or withholding fluid from a power rail for a mass transit vehicle, during movement of a mass transit vehicle on a pathway in an uncovered (or exposed) area of the pathway, fluid, for example, anti-icing fluid, is caused to be provided to (or dispensed on) the power rail supplying power to the mass transit vehicle. During movement of the mass transit vehicle in a covered area of the pathway, the fluid is withheld from (or not dispensed on) the power rail. The changing from fluid being dispensed on the power rail to the fluid being withheld from the power rail, or vice versa, can be based on movement of the mass transit vehicle from the uncovered area of the pathway to the covered area of the pathway, or vice versa.

17 Claims, 6 Drawing Sheets

(56) References Cited

U.S. PATENT DOCUMENTS

| | | | | |
|---|---|---|---|---|
| 4,993,327 | A * | 2/1991 | Labarre | B61B 13/08 104/290 |
| 5,477,941 | A * | 12/1995 | Kumar | B61K 3/02 184/3.2 |
| 5,896,947 | A * | 4/1999 | Kumar | B61K 3/02 184/108 |
| 6,360,998 | B1 * | 3/2002 | Halvorson | B61L 3/06 246/122 R |
| 6,946,621 | B1 * | 9/2005 | Roseman | B60B 39/025 219/202 |
| 9,096,983 | B1 * | 8/2015 | Mejia | E01H 10/007 |
| 9,375,737 | B1 * | 6/2016 | Zucker | B05B 7/1666 |
| 2004/0262425 | A1 * | 12/2004 | Sakai | B05B 12/12 239/128 |
| 2007/0284889 | A1 * | 12/2007 | Leslie | E01B 7/24 291/2 |
| 2014/0202817 | A1 * | 7/2014 | Nitti | B60L 5/24 191/59.1 |
| 2014/0305924 | A1 * | 10/2014 | Uchtmann | B60L 5/02 219/202 |
| 2015/0274034 | A1 * | 10/2015 | Hourtane | B60L 5/39 191/6 |

FOREIGN PATENT DOCUMENTS

| | | |
|---|---|---|
| CN | 101701976 A | 5/2010 |
| CN | 202827630 U | 3/2013 |
| DE | 102011054610 A1 | 4/2012 |
| EP | 1086874 A1 | 3/2001 |
| GB | 967900 | 8/1964 |
| GB | 1013502 | 12/1965 |
| GB | 1165357 | 9/1969 |
| GB | 2456414 A | 7/2009 |
| JP | 892902 A | 4/1996 |
| KR | 101407940 B1 | 6/2014 |

* cited by examiner

FIG. 6

FLUID SPRAYING SYSTEM AND METHOD FOR A MASS TRANSIT VEHICLE

BACKGROUND OF THE INVENTION

Field of the Invention

The present invention relates to mass transit vehicles and, more particularly, to dispensing anti-icing fluid on power rails which supply electrical power to such mass transit vehicles.

Description of Related Art

Heretofore, anti-icing systems of mass transit vehicles were configured to continuously dispense anti-icing fluid onto power rails that provided power to the mass transit vehicles via one or more power collecting shoes of each mass transit vehicle regardless of whether one or more sections of the power rail require anti-icing fluid. To this end, exposed or uncovered sections of a power rail subject to ice forming thereon, e.g., freezing rain and/or melting snow that subsequently freezes, obviously benefits from the application of anti-icing fluid thereon. However, covered sections of the power rail, for example sections of the power rail passing through tunnels or covered passenger stations, where the power rail is not exposed to water and, hence, said water freezing thereon, do not benefit by the application of the anti-icing fluid. Indeed, application or dispersing of anti-icing fluid on areas of the power rail that are covered is not only a waste of the anti-icing fluid but is also not environmentally friendly.

SUMMARY OF THE INVENTION

Various preferred and non-limiting examples or aspects of the present invention will now be described and set forth in the following numbered clauses:

Clause 1: A mass transit vehicle comprises: a first power collecting shoe configured to contact a power rail disposed along a pathway and to deliver electrical power from the power rail to one or more electrical circuits of the mass transit vehicle as the mass transit vehicle moves along the pathway; a fluid reservoir; and a controller operative for automatically causing a fluid in the fluid reservoir to be provided to or withheld from the power rail based on positions of the mass transit vehicle on the pathway.

Clause 2: The mass transit vehicle of clause 1, wherein: the fluid is an anti-icing fluid; the fluid is withheld from the power rail at a covered position on the pathway; and the fluid is provided to the power rail at an uncovered position on the pathway.

Clause 3: The mass transit vehicle of clause 1 or 2, further including a first sensor operative for acquiring data from a marker on the pathway, wherein the controller automatically provides or withholds the fluid from the power rail based on the acquired data.

Clause 4: The mass transit vehicle of any of clauses 1-3, further including a second sensor operative for outputting a signal related to a distance traveled or a velocity of the mass transit vehicle.

Clause 5: The mass transit vehicle of any of clauses 1-4, wherein the second sensor is operative for outputting a signal related to rotational movement of a wheel of the mass transit vehicle.

Clause 6: The mass transit vehicle of any of clauses 1-5, wherein: the controller processes the output of the second sensor during movement of the mass transit vehicle on the pathway to determine a distance the mass transit vehicle travels; and the controller is operative for automatically providing the fluid to or withholding the fluid from the power rail in response to determining that the mass transit vehicle has traveled a predetermined distance from the marker on the pathway.

Clause 7: The mass transit vehicle of any of clauses 1-6, wherein: the marker is positioned at an uncovered position on the pathway where the controller automatically provides the fluid to the power rail and the predetermined distance from the marker on the pathway is a covered position on the pathway where the controller automatically withholds the fluid from the power rail; or the marker is positioned at a covered position on the pathway where the controller automatically withholds the fluid from the power rail and the predetermined distance from the marker is an uncovered position on the pathway where the controller automatically provides the fluid to the power rail.

Clause 8: The mass transit vehicle of any of clauses 1-7, wherein the covered position on the pathway includes a covered terminal or station area of the pathway through which the mass transit vehicle passes on the pathway, or a tunnel through which the mass transit vehicle passes on the pathway.

Clause 9: The mass transit vehicle of any of clauses 1-8, wherein the controller includes a microprocessor, or a digital signal processor (DSP), or a field programmable gate array (FPGA) for processing the output of the second sensor to determine the change of position.

Clause 10: The mass transit vehicle of any of clauses 1-9, wherein the predetermined distance includes a distance added to the position of the marker on the pathway.

Clause 11. The mass transit vehicle of any of clauses 1-10, wherein the predetermined distance further includes a distance between a position of the first sensor on the mass transit vehicle and a position on the mass transit vehicle where the fluid is provided to the power rail.

Clause 12: The mass transit vehicle of any of clauses 1-11, further including a GPS receiver, wherein the controller is operative for automatically causing the fluid to be provided to or withheld from the power rail based on GPS coordinates output by the GPS receiver.

Clause 13: The mass transit vehicle of any of clauses 1-12, wherein: the mass transit vehicle includes a plurality of cars connected in series; and the fluid is provided to the power rail from a car at one end of the plurality of cars.

Clause 14: The mass transit vehicle of any of clauses 1-13, further comprising: a second power collecting shoe, wherein the first and second power collecting shoes are disposed on respective first and second sides of the mass transit vehicle; and a sensor operative for detecting the presence or absence of contact between the power rail and the first power collecting shoe or the second power collecting shoe and for providing to the controller an indication of said presence or absence of contact, wherein the controller is responsive to said indication for causing the fluid to be provided solely to a side of the vehicle where the power rail is contacted by the first power collecting shoe or the second power collecting shoe and for causing the fluid to be withheld from the other side of the vehicle.

Clause 15: The mass transit vehicle of any of clauses 1-14, further comprising a spray head, wherein the fluid is provided to the power rail via the spray head.

Clause 16: The mass transit vehicle of any of clauses 1-15, wherein the power collecting shoe comprises the spray head.

Clause 17: A method of automatically providing or withholding fluid from a power rail for a mass transit vehicle, the method comprising the steps of: (a) during movement of a mass transit vehicle on a pathway in an uncovered (or exposed) area of the pathway, automatically causing fluid to be provided to (or dispensed on) a power rail supplying power to the mass transit vehicle; and (b) during movement of the mass transit vehicle in a covered area of the pathway, automatically causing the fluid to be withheld from (or not dispensed on) the power rail.

Clause 18: The method of clause 17, further including: (c) automatically changing from causing the fluid to be provided to the power rail to causing the fluid to be withheld from the power rail based on movement of the mass transit vehicle from the uncovered area of the pathway to the covered area of the pathway, respectively; or (d) automatically changing from causing the fluid to be withheld from the power rail to causing the fluid to be provided to the power rail based on movement of the mass transit vehicle from the covered area of the pathway to the uncovered area of the pathway, respectively.

Clause 19: The method of clause 17 or 18, wherein at least one of step (c) and (d) is based on GPS coordinates of a GPS receiver of the mass transit vehicle and, optionally, a direction of movement of mass transit vehicle on the pathway with respect to the covered area or the uncovered area.

Clause 20: The method of any of clauses 17-19, wherein at least one of step (c) and (d) occurs in response to determining that the mass transit vehicle has traveled a predetermined distance on the pathway from a marker associated with the pathway.

Clause 21: The method of any of clauses 17-20, wherein the predetermined distance further includes a distance from a marker sensor on the mass transit vehicle and a position on the mass transit vehicle where the fluid is dispensed.

Clause 22: The method of any of clauses 17-21, further including: detecting the presence of the power rail on a first side of the mass transit vehicle or a second side of the mass transit vehicle; and during step (a), causing the fluid to be dispensed solely on the first side or the second side of the mass transit vehicle based on the detected presence of the power rail on said first side or said second side of the mass transit vehicle.

DETAILED DESCRIPTION OF THE INVENTION

The following examples will be described with reference to the accompanying figures where like reference numbers and their primes (e.g., 20 and 20') correspond to like or functionally equivalent elements.

Figure 1:
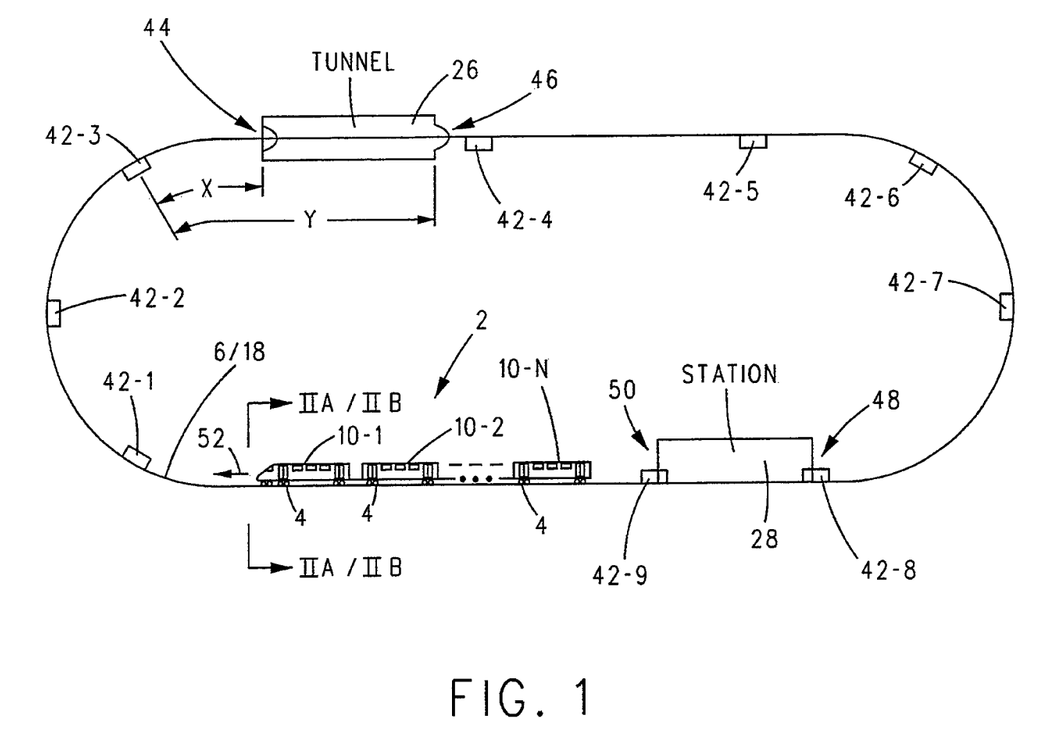
FIG. 1 is a schematic illustration of a mass transit vehicle on a pathway that includes portions that are uncovered and portions that are covered by a tunnel and a station, which pathway include markers along the length thereof.

With reference to FIG. 1, a vehicle 2, such as a mass transit vehicle, includes wheels 4 which are configured to travel along a pathway 6.

Figure 2A:
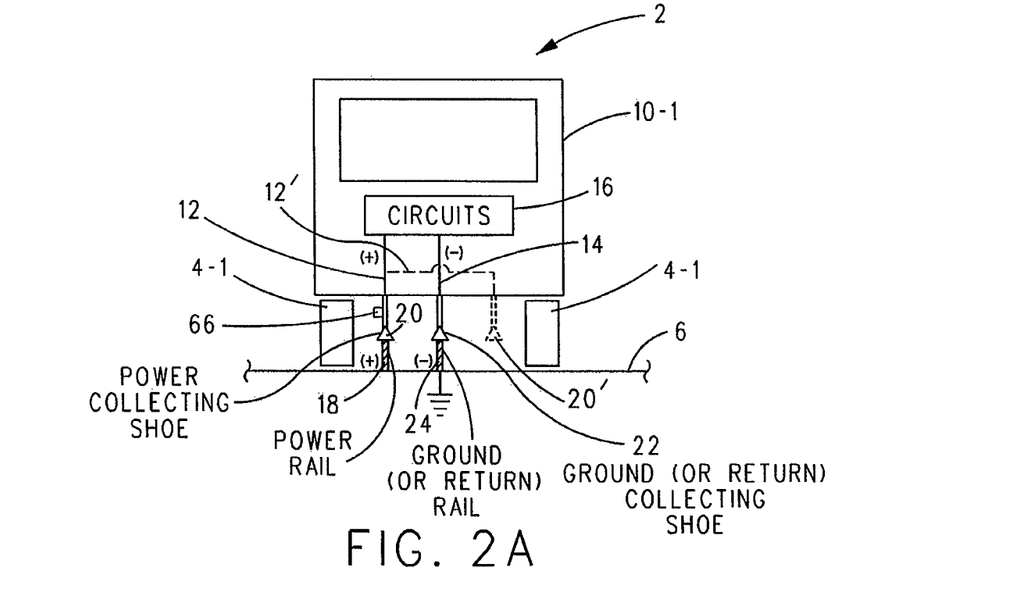
FIG. 2A is a front view of an example mass transit vehicle shown in FIG. 1 taken along the lines IIA-IIA in FIG. 1.
Figure 2B:
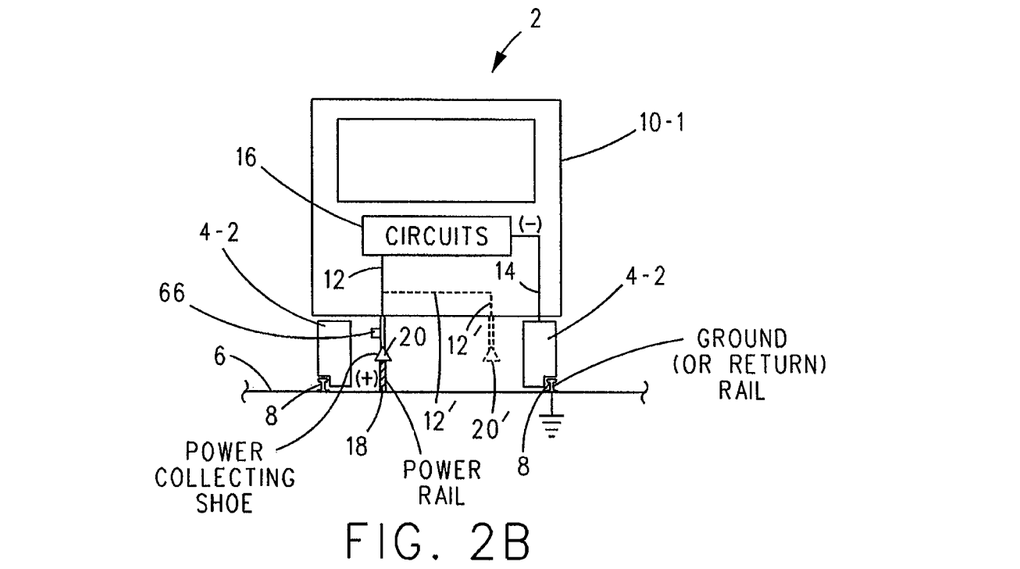
FIG. 2B is a front view of another example mass transit vehicle taken along lines IIB-IIB in FIG. 1.

With reference to FIGS. 2A-2B and with continuing reference to FIG. 1, where pathway 6 is a smooth surface, wheels 4 can be tired wheels 4-1 (FIG. 2A). In contrast, where pathway 6 includes one or more rails 8, wheels 4 can be conventional rail wheels 4-2 designed to travel on said one or more rails 8 (FIG. 2B). The description herein of wheels 4 and pathway 6 is not to be construed in a limiting sense since it is envisioned that vehicle 2 can be configured to travel along any type of pathway including, without limitation, a monorail, or along a pathway via magnetic levitation.

Vehicle 2 can include any number of cars 10 including one car 10-1, or plural (two or more) cars 10-1-10-N as deemed suitable and/or desirable for a particular application. Accordingly, the disclosure and/or illustration herein of any number of cars 10 is not to be construed in a limiting sense.

Figure 3:
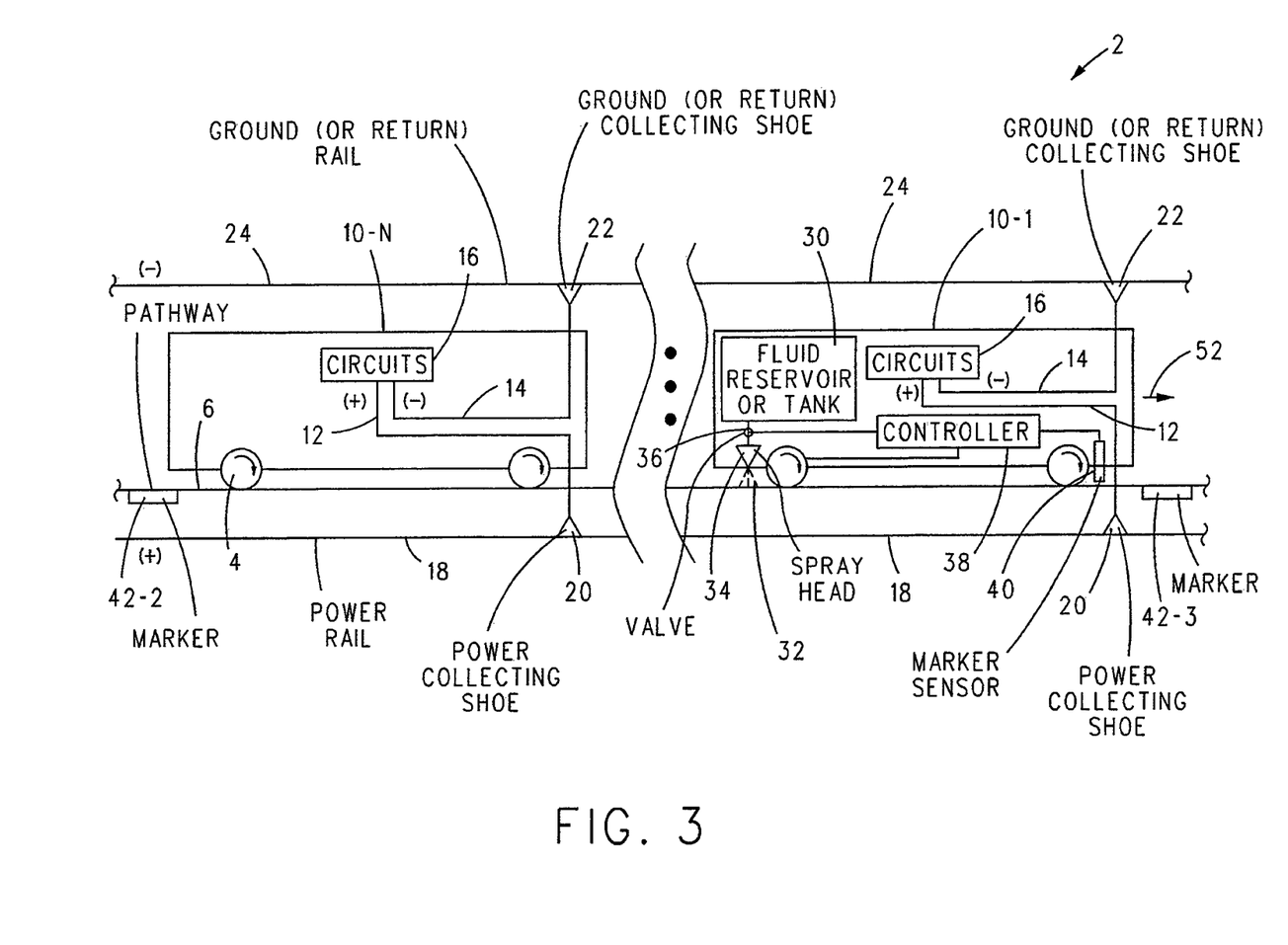
FIG. 3 is a schematic side view of an example of the mass transit vehicle shown in FIG. 1.

With reference to FIG. 3 and with continuing reference to all previous figures, each car 10 includes a positive conductor 12 and a negative conductor 14 for supplying electrical power to one or more electrical circuits 16 of car 10 as car 10 moves along pathway 6. Pathway 6 includes a power rail 18 that runs along the length of pathway 6 for supplying electrical power to circuits 16 of each car 10 via positive conductor 12 and a power collecting shoe 20 of car 10 that is biased into contact with power rail 18.

Where wheels 4 of vehicle 2 are tired wheels 4-1, negative conductor 14 of each car 10 can be coupled to system ground or earth ground via a ground (or return) collecting shoe 22 of the car 10 that is biased into contact with a ground or return rail 24 that runs along the length of pathway 6 (FIG. 2A). Where wheels 4 of vehicle 2 are rail wheels 4-2, negative conductor 14 of each car 10 can be coupled to system ground or earth ground via one or more of the rails 8 made of steel or other electrically conductive material acting in a capacity as a ground (or return) path via rail wheels 4-2 which, like the one or more running rails 8, are made of steel or other electrically conductive material.

The particular manner described herein that the negative conductor 14 of each car 10 is coupled to system ground or earth ground is not to be construed in a limiting sense since it is envisioned that any suitable and/or desirable means, now known or hereinafter developed, for connecting negative conductor 14 of each car 10 to a system ground or an earth ground can be used. Moreover, the illustration and discussion of power collecting shoe 20 biased into contact with power rail 18 for delivering positive electrical power to the positive conductor 12 of each car 10 is not to be construed as limiting the invention since it is envisioned that any suitable and/or desirable means, now known or hereinafter developed, can be utilized to deliver electrical power to said positive conductor 12. Finally, the particular configuration of power rail 18 and ground rail 22 in FIG. 2A is not to be construed as limiting since it is envisioned that any suitable and/or desirable arrangement, now known or hereinafter developed, of power rail 18 and ground rail 22 can be utilized. For example, power rail 18 and ground rail 22 can be part of a sandwich structure that includes an electrical insulator between power rail 18 and ground rail 22, and power collecting shoe 20 and ground collecting shoe 22 can be configured to exclusively contact power rail 18 and ground rail 22, respectively, configured as a sandwich structure. Accordingly, the illustration of power rail 18 and ground rail 22 as being separate structures that run along the length of pathway 6 is not to be construed in a limiting sense.

For the purpose of simplicity, hereinafter, examples will be described with reference to a vehicle 2 having cars 10 that include ground shoes 22 in contact with ground rail 24. However, this is not to be construed in a limiting sense.

As discussed above, anti-icing systems of prior art vehicles were configured to continuously dispense anti-icing fluid onto power rail 18 when there existed conditions favorable to the formation of ice on power rail 18. This meant that the anti-icing fluid was dispensed not only in areas of pathway 6 that are open or exposed (uncovered) to receiving rain and snow, but also in areas of pathway 6 that are not exposed (covered) to rain and snow, such as, for example, without limitation, the inside of a tunnel 26 or a covered or enclosed station 28. Not only does this waste anti-icing fluid, it also sprays the anti-icing fluid on the ground thereby not being environmentally friendly.

With reference to FIG. 3 and with continuing reference to all previous figures, the example vehicle 2 shown in FIG. 3 includes a plurality of cars 10-1-10-N. However, it is envisioned that vehicle 2 can include a single car 10-1. In this example, car 10-1 includes a fluid reservoir or tank 30 configured to hold an anti-icing fluid 32 that is to be dispensed on power rail 18 via a spray head 34 under the control of a valve 36 which operates under the control of a controller 38.

A marker sensor 40 is positioned on vehicle 2; in this example, adjacent the front of car 10-1, and is coupled to controller 38. Marker sensor 40, under the control of controller 38, is configured and operative for acquiring data from one or more markers 42 positioned at one or more locations along the length of pathway 6 in response to movement of vehicle 2 and, hence, marker sensor 40 by said marker(s) 42. Each marker 42 can be any type of active or passive device that is capable of storing data, such as, for example, without limitation, regarding the relative or absolute position of marker 42 on pathway 6. For example, marker 42 can be a bar code or can be an RFID chip that is programmed with the absolute or relative position of marker 42 on pathway 6. In an example, the relative position of each marker 42 on pathway 6 can include its position relative to other markers 42. In an example, the absolute position of a marker 42 can include the absolute position of said marker 42, e.g., in kilometers, from a fixed reference point such as, without limitation, a first marker 42 which can be the starting point (zero kilometers) of pathway 6. Marker sensor 40 can be any suitable and/or desirable device that is capable of reading the data embedded in each marker 42. For example, some markers 42 can include bar codes while other markers 42 can include RFID chips. In this example, marker sensor 40 can be configured to read acquired data from both type of markers 42.

The use of active markers 42, versus the passive markers 42 described above, such as, without limitation, a short range RF transmitter that is programmed with and capable of transmitting relative or absolute position information regarding the said marker 42 on pathway 6 to marker sensor 40 which includes appropriate RF receiving circuitry, is also envisioned.

Based on the data acquired by marker sensor 40 from each marker 42, controller 38 can determine a position of vehicle 2 on pathway 6. For example, the pathway 6 shown in FIG. 1 can include markers 42-1-42-9 positioned at various, fixed locations along the length of pathway 6. The illustration in FIG. 1 of pathway 6 being a closed-loop pathway is not to be construed as limiting the invention since pathway 6 can be an open-loop pathway.

In an example, in response to vehicle 2 and, hence, marker sensor 40 moving past marker 42-3 in the direction shown by arrow 52, controller 38 can determine from data acquired from marker 42-3 the position of marker 42-3, and, hence, vehicle 2, on pathway 6. In an example, controller 38 can be programmed with a distance X between marker 42-3 and an entrance 44 of tunnel 26. Alternatively, in another example, the data acquired by controller 38 from marker 42-3 can include distance X.

In an example, starting from a state where fluid 32 is being dispensed on power rail 18, as vehicle 2 travels along pathway 6 from marker 42-3 to entrance 44 of tunnel 26, controller 38 continuously or periodically determines the distance vehicle 2 travels from marker 42-3. Upon determining that marker sensor 40 and, hence, vehicle 2 has traveled distance X, controller 38 is programmed to automatically cause valve 36 to close thereby withholding the providing or dispensing of fluid 32 on power rail 18 within tunnel 26. In a similar manner, controller 38 can be programmed with a distance Y which is the distance between marker 42-3 and exit 46 of tunnel 26. Alternatively, in another example, the data acquired by controller 38 from marker 42-3 can include distance Y. Upon determining that marker sensor 40 and, hence, vehicle 2 has traveled distance Y, controller 38 can automatically activate valve 36 to thereby cause fluid 32 to once again be dispensed on power rail 18.

In an example 1, suppose that marker 42-3 is positioned at the beginning of pathway 6, e.g., at the 0 km position of pathway 6. Suppose that distances X and Y are each 0.5 km, whereupon entrance 44 of tunnel 26 is at 0.5 km from the start of pathway 6 and exit 46 of tunnel 26 is 1 km from the start of pathway 6. Suppose further that controller 38 is programmed with or acquires distances X and Y from marker 42-3 which are related to the distance between marker 42-3 and entrance 44 of tunnel 26 and exit 46 of tunnel 26, respectively.

Starting from a state where valve 36 is in an open state and fluid 32 is being dispensed on power rail 18 in response to vehicle 2 and, hence, marker sensor 40 passing marker 42-3 moving in the direction shown by arrow 52 in FIG. 1, controller 38 via a suitable sensor (discussed hereinafter) determines when marker sensor 40 and, hence, vehicle 2 has traveled distance X (0.5 km) from marker 42-3 and automatically, via controlling valve 36 to move from the open state to a closed state, causes the dispensing of fluid 32 to cease whereupon fluid is withheld from power rail 18 beginning on or about the entrance 44 of tunnel 26.

While traveling in tunnel 26, controller continues to track, via the suitable sensor (discussed hereinafter), the distance that marker sensor 40 and, hence, vehicle 2 has traveled from marker 42-3. Upon determining that marker sensor 40 and, hence, vehicle 2 has traveled distance Y (1 km) from marker 42-3, corresponding to exit 46 of tunnel 26, controller 38, automatically, via controlling valve 36 to move from the closed state to the open state, causes fluid 32 to once again be dispensed from fluid reservoir 30 onto power rail 18. In this manner, controller 36 can be operative for automatically causing fluid 32 to be provided to and withheld from power rail 18 based on positions of vehicle 2 on pathway 6, namely, when vehicle 2 is in a uncovered portion of pathway 6, controller 2 can be programmed to automatically cause fluid to be provided to (or dispensed on) power rail 18 and when vehicle 2 is in a covered portion of pathway 6 controller 38 can be programmed to automatically cause fluid to be withheld from (or not dispensed on) power rail 18.

In an example 2, suppose that pathway 6 includes markers 42-8 and 42-9 adjacent an entrance 48 and an exit 50 of a covered area of pathway 6, e.g., covered station 28. Marker 42-8 can be positioned within covered station 28 or just outside of entrance 48 of covered station 28. Similarly marker 42-9 can be positioned within covered station 28 or just outside of exit 50 of covered station 28. In this example, in response to marker sensor 40 and, hence, vehicle 2 passing by marker 42-8 into station 28 in the direction shown by arrow 52 in FIG. 1, controller 38 can automatically, via internal programming or data acquired from marker 42-8, terminate or withhold the dispensing of fluid 32 onto power rail 18. Similarly, in response to marker sensor 40 and, hence, vehicle 2 moving from covered station 28 past marker 42-9 into an uncovered area of pathway 6, controller 38 can automatically, via internal programming or data acquired from marker 42-9, cause fluid 32 to be provided to (or dispensed onto) power rail 18.

It is to be appreciated that within tunnel 26 or within station 28, controller 38, either via its internal programming and/or via data acquired from one or more markers 42, can be caused to not dispense or withhold fluid 32 from being dispensed on power rail 18 in all or substantially all of tunnel 26 or station 28. The data acquired from one or more markers 42 can include a distance, including a distance of 0 km, to or from an entrance of a tunnel or station, and/or a distance, including a distance of 0 km, to or from an exit of a tunnel or station. The data acquired from each marker 42 can also or alternatively include a digital bit which can be set in a first state that causes controller 38 to dispense fluid 32 onto power rail 18 and which can be set in a second state to cause controller 38 to withhold fluid 32 from being dispensed on power rail 18. Of course, combinations of the above examples are also envisioned.

In an example 3, suppose marker 42-4 is positioned adjacent exit 46 outside of tunnel 26. In this case, controller 38 can, via internal programming or via data acquired from marker 42-4 can commence providing or dispensing fluid 32 on power rail 18 upon marker sensor 40 moving past marker 42-4. In this manner, it would not be necessary for controller 38 to determine if marker sensor 40 and, hence, vehicle 2 has traveled distance Y, as in example 1 above.

The example vehicle 2 shown in FIG. 3 can include a single car 10-1 or a plurality of cars 10-1-10-N. In the case where vehicle 2 includes a plurality of cars 10-1-10-N and fluid 32 is dispensed from a car 10 other than the final car (10-N) of vehicle 2 during movement of vehicle 2 in the direction shown by arrow 52, power collector shoes 20 of cars 10 following the dispensing of fluid 32 on power rail 18 can wipe dispensed fluid 32 from power rail 18, thereby minimizing the effectiveness of fluid 32 on power rail 18.

Figure 4:
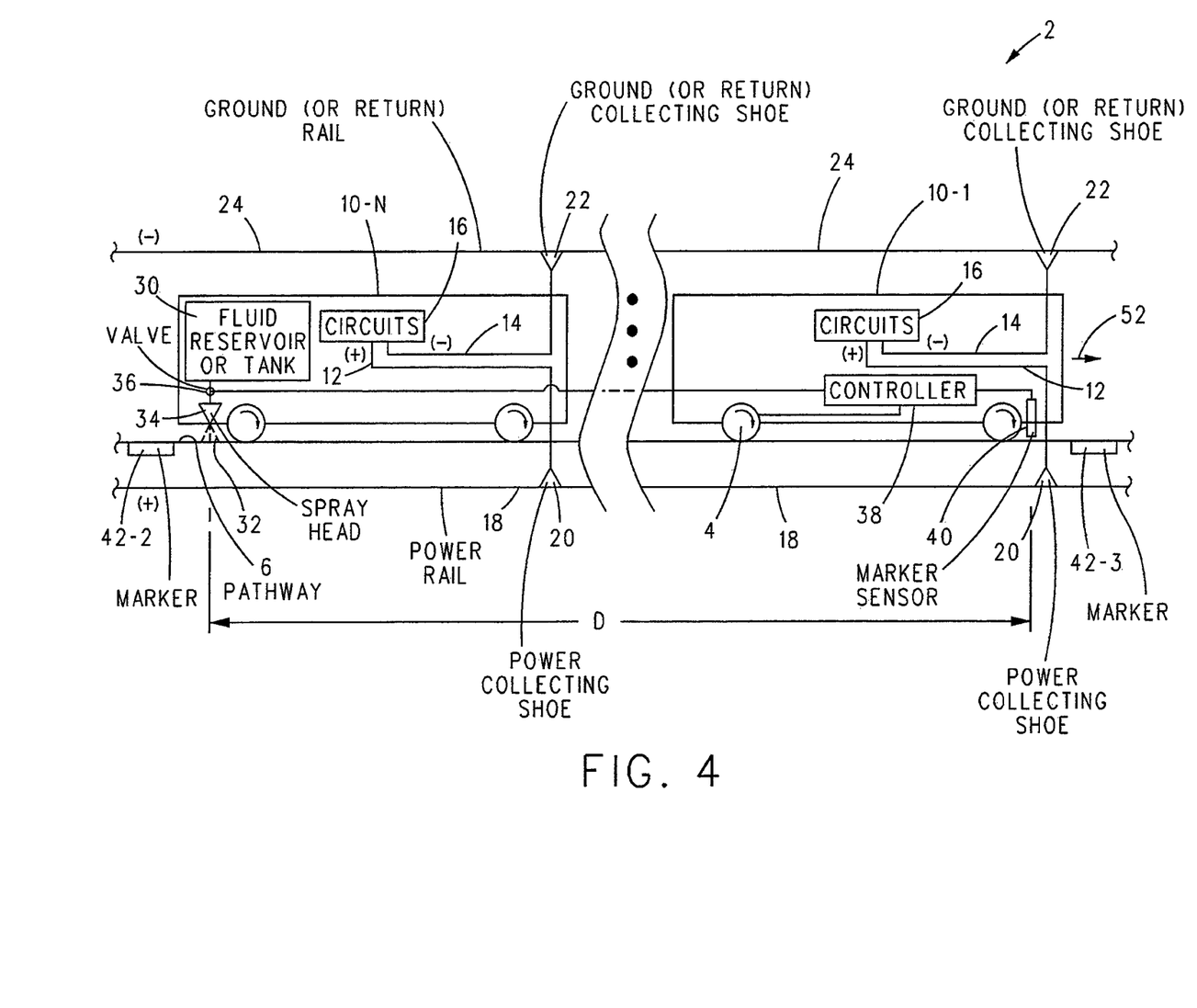
FIG. 4 is a schematic side view of another example of the mass transit vehicle shown in FIG. 1.

To avoid this, in an example shown in FIG. 4, fluid reservoir 30, valve 36 (under the control of controller 38), and spray head 34 can be positioned in the last or end car 10-N of vehicle 2 at a location where fluid 32 is dispensed on power rail 18 after passage of all power collecting shoes 20 of vehicle 2 on power rail 18 during movement of vehicle 2 in the direction shown by arrow 52. For example, as shown in FIG. 4, fluid 32 is dispensed on power rail 18 at the end of car 10-N opposite the direction of movement of vehicle 2 shown by arrow 52. In this manner, fluid 32 dispensed on power rail 18 is not wiped from power rail 18 by any power collecting shoe 20 of vehicle 2. Rather, fluid 32 remains on power rail 18 until subsequently removed, e.g., by evaporation, or by rain, or by snow, or by the passage of power collecting shoes 20 of the same or another vehicle 2 at a later time.

With continuing reference to FIG. 4, in an example, marker sensor 40 can be spaced from spray head 34 that dispenses fluid 32 onto power rail 18 by a distance D. To facilitate dispensing fluid 32 on power rail 18 in uncovered areas of pathway 6 while not dispensing (or withholding) fluid 32 from power rail 18 in covered areas of pathway 6, such as, for example, in tunnel 26 and/or in station 28, controller 38 can be programmed with distance D.

In an example 4 that builds on example 1 above, in response to vehicle 2 moving in the direction shown by arrow 52 in FIG. 1 and marker sensor 40 passing marker 42-3, controller 38 can determine the distance vehicle 2 travels from marker 42-3. For the purpose of simplicity herein, it will be assumed that in response to marker sensor 40 passing a marker 42, controller 38, via internal programming or data acquired from said marker 42, can determine a distance to be traveled (including 0 km) before causing valve 36 to change state and either terminate supplying fluid 32 from power rail 18 or commence supplying fluid 32 from power rail 18 in the manner described herein. For example, upon determining that marker sensor 40 and, hence, vehicle 2 has traveled the sum of distances X+D past marker 42-3, indicative of spray head 34 being positioned about entrance 44 of tunnel 26, controller 38 can automatically, via controlling valve 36 to move from an open state to a closed state, terminate the dispensing or providing of fluid 32 to power rail 18.

During the time that spray head 34 is positioned inside tunnel 26, controller maintains valve 36 in a closed state to withhold fluid 32 from being dispensed on power rail 18.

Upon determining that marker sensor 40 and, hence, vehicle 2 has traveled the sum of distances Y+D past marker 42-3, indicative of spray head 34 being positioned about exit 46 of tunnel 26, controller 38 can automatically, via controlling valve 36 to move from a closed state to an open state, cause fluid 32 to once again be provided to or dispensed on power rail 18.

In an example 5 further to example 2 above where markers 42-8 and 42-9 are positioned at entrance 48 and exit 50 of station 28, in response to vehicle 2 moving in the direction shown by arrow 52 and marker sensor 40 passing marker 42-8, controller 38 determines the distance vehicle 2 travels in station 28 after marker sensor 40 passes marker 42-8. Upon determining that marker sensor 40 and, hence, vehicle 2 has traveled distance D, indicative of spray head 34 being positioned about entrance 48 of station 28, controller 38 controls the open/closed state of valve 36 to stop dispensing (and withhold) fluid 32 from power rail 18. Similarly, in response to vehicle 2 moving in the direction shown by arrow 52 and marker sensor 40 passing marker 42-9, controller 38 determines the distance vehicle 2 travels after marker sensor 40 passes marker 42-9. Upon determining that marker sensor 40 and, hence, vehicle 2 has traveled distance D past marker 42-9, indicative of spray head 34 being positioned about exit 50 of station 28, controller 38 controls the open/closed state of valve 36 to commence dispensing fluid 32 onto power rail 18. Also or alternatively, where marker sensor 42-9 is not present, controller 38 can determine the distance vehicle 2 travels after marker sensor 40 passes marker 42-8. Upon determining that marker sensor 40 and, hence, vehicle 2 has traveled distance D past exit 50 of station 28 indicative of spray head 34 being positioned about exit 50 of station 28, controller 38 controls the open/closed state of valve 36 to commence dispensing fluid onto power rail 18.

In another example 6, combinations of the foregoing examples of dispensing fluid 32 from vehicle 2 shown in FIG. 4 are also envisioned. For example, controller 38 can be programmed with distance X between marker 42-3 and entrance 44 of tunnel 26 and distance D. In this example, in response to vehicle 2 moving in direction 52 and marker sensor 40 passing marker 42-3, controller 38 determines the distance that marker sensor 40 and, hence, vehicle 2 travels from marker 42-3. Upon determining that marker sensor 40 and, hence, vehicle 2 has traveled the sum of distances X+D from marker 42-3, indicative of spray head 32 be positioned about entrance 44 of tunnel 26, controller 38 terminates or commences withholding the dispensing of fluid 32 from power rail 18. While traveling through tunnel 26, controller withholds fluid 32 from being dispensed on power rail 18.

In response to vehicle 2 moving in direction 52 and marker sensor 40 passing marker 42-4, controller 38 determines the distance that marker 40 and, hence, vehicle 2 travels from marker 42-4. Upon determining that marker sensor 40 and, hence, vehicle 2 have traveled distance D past marker 42-4, indicative of spray head 34 being positioned about exit 46 of tunnel 26, controller 38 controls valve 36 to cause fluid 32 to once again be dispensed on power rail 18.

Figures 5A, 5B:
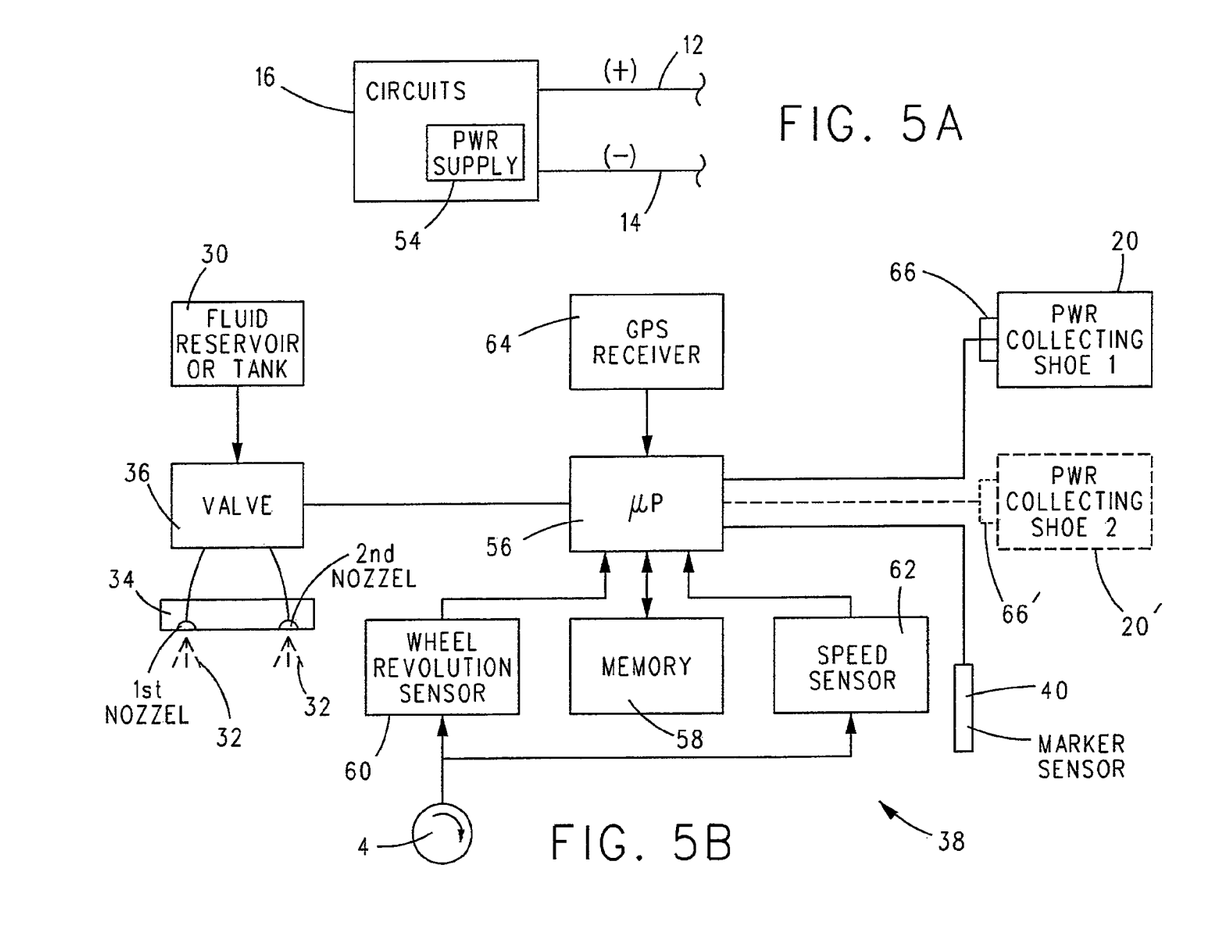
FIG. 5A is an isolated schematic view of one of the circuits shown in FIGS. 3 and 4.
FIG. 5B is a schematic view of example elements that can form each controller shown in FIGS. 3 and 4 along with a valve for controlling the dispensing of fluid and one or more sensors for detecting when power collecting shoe(s) is/are in contact with a power rail.

With reference to FIGS. 5A-5B, in an example, each circuit 16 includes a power supply 54 which converts incoming power supplied by positive and negative conductors 12 and 14 to one or more voltages suitable for use by, among other things, controller 38. Controller 38 can include a processing unit 56, such as a microprocessor, a digital signal processor (DSP), a field programmable gate array (FPGA), and/or other suitable and/or desirable sequential state machine, which is capable of executing a control program that automatically enables fluid 32 to be dispensed along uncovered areas along pathway 6 and to withhold the dispensing of fluid along covered areas of pathway 6 in the manner described above in one or more of the foregoing examples. Controller 38 can include a memory 58 coupled to processing element 56. In an example memory 58 can store one or more of the control program, operating variables, and/or data such as, for example, distances X, Y, and/or D discussed above. In another example, memory 58 can also store data regarding which markers 42 are used to trigger a change in the state of dispensing of fluid 32 onto power rail 18 or terminating the dispensing of fluid 32 onto power rail 18.

In an example, in response to marker sensor 40 passing by marker 42-3 due to the movement of vehicle 2 in direction 52, processing element 56, operating under the control of the control program stored in memory 58, executes instructions to track the distance marker sensor 40 and, hence, vehicle 2 travels past marker 42-3 and compares this distance to a pre-determined distance that is programmed into controller 38, e.g., memory 58, and/or acquired by controller 38 from marker 42-3, for example, distance X, when vehicle 2 is configured as shown in FIG. 3 or the sum of distances X+D when vehicle 2 is configured as shown in FIG. 4. Upon determining that marker sensor 40 and, hence, vehicle 2 has traveled the pre-determined distance, controller 38 can terminate the dispensing of fluid 32 onto power rail 18 as discussed above. In a similar manner, processing element 56, operating under the control of the control program, can determine when to commence dispensing fluid about the time spray head 34 passes exit 46 of tunnel 26. Similarly, processing element 56, operating under the control of the control program, can determine when to terminate and commence the dispensing of fluid about the time spray head 34 passes entrance 48 and exit 50 of station 28, respectively.

Controller 38 can include a wheel revolution sensor 60 and/or a speed sensor 62 that provides to processing element 56 information regarding a distance traveled by marker sensor 40 and, hence, vehicle 2 on pathway 6. In an example, wheel revolution sensor 60 can be coupled to a wheel 4 of vehicle 2 and can be configured to provide to processing element 56 a count of the number of whole or partial revolutions of wheel 4 which processing element 56 can convert into a linear distance that wheel 4 has traveled in a manner known in the art, e.g., $2\pi r$ times the number of whole or partial revolutions of wheel 4, where r equals the radius of wheel 4. In other words, wheel revolution sensor 60 outputs a signal related to a distance traveled of vehicle 2. In an example, the combination of wheel revolution sensor 60 and processing element 56 act in the manner of a vehicle odometer to determine a distance traveled by vehicle 2.

Also or alternatively, in another example, speed sensor 62 can be configured to translate the rotational velocity of wheel 4 into a linear velocity (V) of vehicle 2 which can be provided to processing element 56 which, in-turn, can mathematically integrate the velocity with respect to time to determine the distance that vehicle 2 has traveled. In this example, speed sensor 62 outputs a signal related to a velocity of vehicle 2.

Also or alternatively, in another example, controller 38 can include a GPS receiver 64 that continuously or periodically provides GPS data to processing element 56. In this example, memory 58 can be programmed with GPS coordinates of entrance 44 and exit 46 of tunnel 26 and/or entrance 48 and exit 50 of station 26. Upon processing element 56 receiving from GPS receiver 64 GPS coordinates indicating that GPS receiver 64 is at or about entrance 44 of tunnel 26, exit 46 of tunnel 26, entrance 48 of station 20, and/or exit 50 of station 28, processing element 56 can cause the dispensing of fluid 32 on power rail 18 to be terminated on or about the time spray head 34 is entering tunnel 26 or station 28, and/or can commence the dispensing of fluid 32 onto power rail 18 on or about the time spray head 34 is exiting tunnel 26 or station 28.

In another example, it is envisioned that any combination of wheel revolution sensor 60, and/or speed sensor 62, and/or GPS receiver 64 can be utilized by controller 38 to commence dispensing fluid on power rail 18 or to terminate the dispending of fluid on power rail 18 at suitable times. For example, suppose while traveling on pathway 6, GPS receiver does not have a clear path to receive GPS signals from satellites (not shown) in a manner known in the art. Under this circumstance, processing element 56 operating under the control of the control program can utilize the location of one or more markers 42 along with the distance traveled, as determined by wheel revolution sensor 60 and/or speed sensor 62 in the manner described above, to determine when to terminate the dispensing of fluid 32 onto power rail 18 e.g., when entering tunnel 26 and/or station 28, and/or when to commence dispensing fluid 32 onto power rail 18, e.g., upon exiting tunnel 26 and/or station 28.

The foregoing examples assume that vehicle 2 is moving in direction shown by arrow 52. However, it is envisioned that the foregoing examples can also be applicable to vehicle 2 moving in a direction opposite arrow 52. Accordingly, vehicle 2 moving in the direction shown by arrow 52 is not to be construed as limiting the invention.

FIG. 3 illustrates that car 10-1 of vehicle 2 includes spray head 34 while FIG. 4 illustrates that the final or last car 10-N of vehicle 2 includes spray head 34. However, this is not to be construed as limiting since it is envisioned that spray head 34 can be positioned in any car 10 of vehicle 2 with the understanding that if fluid 32 is dispensed from a car 10 other than the final car (10-N) of vehicle 2 that power collecting shoes 20 of cars following the dispensing of fluid 32 can potentially wipe dispensed fluid 32 from power rail 18. Similarly, controller 38 can be positioned in any car 10 of vehicle 2 and fluid reservoir or tank 30 can be positioned in any car 10 of vehicle 2.

Where spray head 34 is disposed in a car 10 other than the first car 10-1 or the final car 10-N, controller 38 can be programmed with a distance D between marker sensor 40 and spray head 34, and spray head 34 can be controlled by controller 38 to dispense fluid 32 on power rail 18 in uncovered areas of pathway 6 while not dispensing (or withholding) fluid 32 from power rail 18 in covered areas of pathway 6 in the manner discussed above for examples 4-6.

The example of car 10-1 shown in FIGS. 2A and 2B includes a first power collecting shoe 20 in contact with power rail 18. However, if vehicle 2 is turned around and run on pathway 6 in the opposite direction, first power collecting shoe 20 would not contact power rail 18. Accordingly, in an example, each car 10 can include a second power collecting shoe 20' (shown in phantom) on the other side of car 10. The second power collecting shoe 20' of each car 10 is coupled to the circuits 16 of said car 10 via a positive conductor 12' (also shown in phantom).

Depending on the configuration of pathway 6, or simply on the space available, power rail 18 can be located on the left side of vehicle 2 in the traveling direction of vehicle 2, power rail 18 can be located on the right side of vehicle 2 in the traveling direction of vehicle 2, and/or the location of power rail 18 can change from the left side of vehicle 2 to the right side as vehicle 2 travels along pathway 6 in a single direction. For example, at a switch, there may be a change of the side of vehicle 2 where power rail 18 resides as vehicle 2 moves past the switch.

To enable controller 38 to determine which of the first or second power collecting shoes 20 or 20' is in contact with power rail 18 for the purpose of dispensing fluid 32 on power rail 18 versus on the other side of vehicle 2 where power rail 18 is not present, at least one power collecting shoe, e.g., the first power collecting shoe 20, includes a sensor 66 (FIG. 5B) that detects when the first power collecting shoe 20 is in contact with power rail 18. Controller 38 can be programmed such that upon detecting via sensor 66 that power collecting shoe 20 is in contact with power rail 18, controller 38 causes fluid 32 to be dispensed on power rail 18 on the side of vehicle 10 where first power collecting shoe 20 resides. In another example, if, via sensor 66, controller 38 determines that first power collecting shoe 20 is not in contact with power rail 18, controller 38 can be programmed to assume that the second power collecting shoe 20' is in contact with power rail 18. Based on this determination, controller causes fluid 32 to be dispensed on power rail 18 on the side of car 10 where second power collecting shoe 20' resides.

In an example, spray head 34 can include a first nozzle configured to dispense fluid onto power rail 18 in contact with first power collecting shoe 20, and can include a second nozzle configured to dispense fluid 32 on power rail 18 in contact with second power collecting shoe 20'. The selective routing of fluid 32 to the first nozzle or the second nozzle of spray head 34 can be accomplished in any suitable and/or desirable manner known in the art. In an example, valve 36 can be a multi-way valve which, under the control of controller 38, can be switched to a state where fluid 32 is dispensed from the first nozzle of spray head 34, or fluid 32 is dispensed from the second nozzle of spray head 34, or valve 36 is in a closed state withholding fluid from being dispensed via spray head 34. The use of multiple valves instead of a single valve 36 to control the dispensing of fluid 32 is envisioned.

In another example, each of the first and second power collecting shoes 20 and 20' can include its own sensor 66 and 66' for affirmatively detecting when said power collecting shoe is in contact with power rail 18. In this example, upon detecting via sensor 66 that first power collecting shoe 20 is in contact with power rail 18, controller causes fluid 32 to be dispensed from the first nozzle of spray head 34. Alternatively, upon detecting via sensor 66' that the second power collecting shoe 20' is in contact with power rail 18, controller 38 causes fluid 32 to be dispensed from the second nozzle of spray head 34.

Sensor 66 or 66' can be any suitable and/or desirable type or style of sensor that, in combination with power collecting shoe 20 or 20', is capable of detecting when said power collecting shoe is in contact with power rail 18. In an example, each power collecting shoe 20 and 20' can be configured to hang loosely when not in contact with power rail 18. In response to making contact with power rail 18, however, said power collecting shoe can change position and the appropriate sensor 66 or 66' can be configured to detect this change of position. In one example, sensor 66 and/or 66' is an optical switch that can be in a first state when the corresponding power collecting shoe is not in contact with power rail 18, and which can be in a second state when power collecting shoe is in contact with power rail 18. However, it is envisioned that any suitable and/or desirable type of switch (optical or mechanical) can be utilized to detect when a power collecting shoe is or is not in contact with power rail 18.

In an example, each car 10 of vehicle 2 includes first and second power collecting shoes 20 and 20'. In this example, controller 38, via one or more of sensors 66 and/or 66', determines whether the first or second power collecting shoe 20 or 20' of car 10 that includes spray head 34 is in contact with power rail 18 as a condition to dispensing fluid 32. In another example, based upon controller 38 determining which power collecting shoe 20 or 20' is in contact with power rail 18 in one car 10, controller 38 can cause fluid to be dispensed via spray head 34 disposed in another car 10. In still another example, controller 38 can determine whether the first power collecting shoe 20 (or the second power collecting shoe 20') in each of a number of cars 10 of vehicle 2 are in contact with power rail 18 as condition to causing spray head 34 to dispense fluid 32 on said power rail 18.

As can be seen, by detecting whether at least one first power collecting shoe 20 or one second power collecting shoe 20' of train 2 is in contact with power rail 18, controller can determine on which side of train 2 to dispense fluid 32 and can cause valve 36 to dispense fluid 32 on said power rail 18.

As can be seen, disclosed herein are a number of examples of apparatus and methods for automatically causing fluid 32 in fluid reservoir 30 to be provided to and withheld from power rail 18 based on positions of vehicle 2 in uncovered and covered areas or positions of pathway 6. Also disclosed herein is the method for automatically causing fluid 32 to be provided to power rail 18 regardless of whether power rail 18 is on the right side or left side of vehicle 2.

In FIGS. 2A and 2B power rail 18 is illustrated as being disposed between the pair wheels 4-1 (FIG. 2A) and between the running rails 8 (FIG. 2B). However, this is not to be construed in a limiting sense since it is envisioned that power rail 18 can be positioned outside of (not between) wheels 4-1 in FIG. 2A and outside of (not between) rails 8 in FIG. 2B. Correspondingly, each power collecting shoe 20 and/or 20' can be likewise positioned outside of (not between) wheels 4-1 in FIG. 2A and outside of (not between) rails 8 in FIG. 2B.

Figure 6:
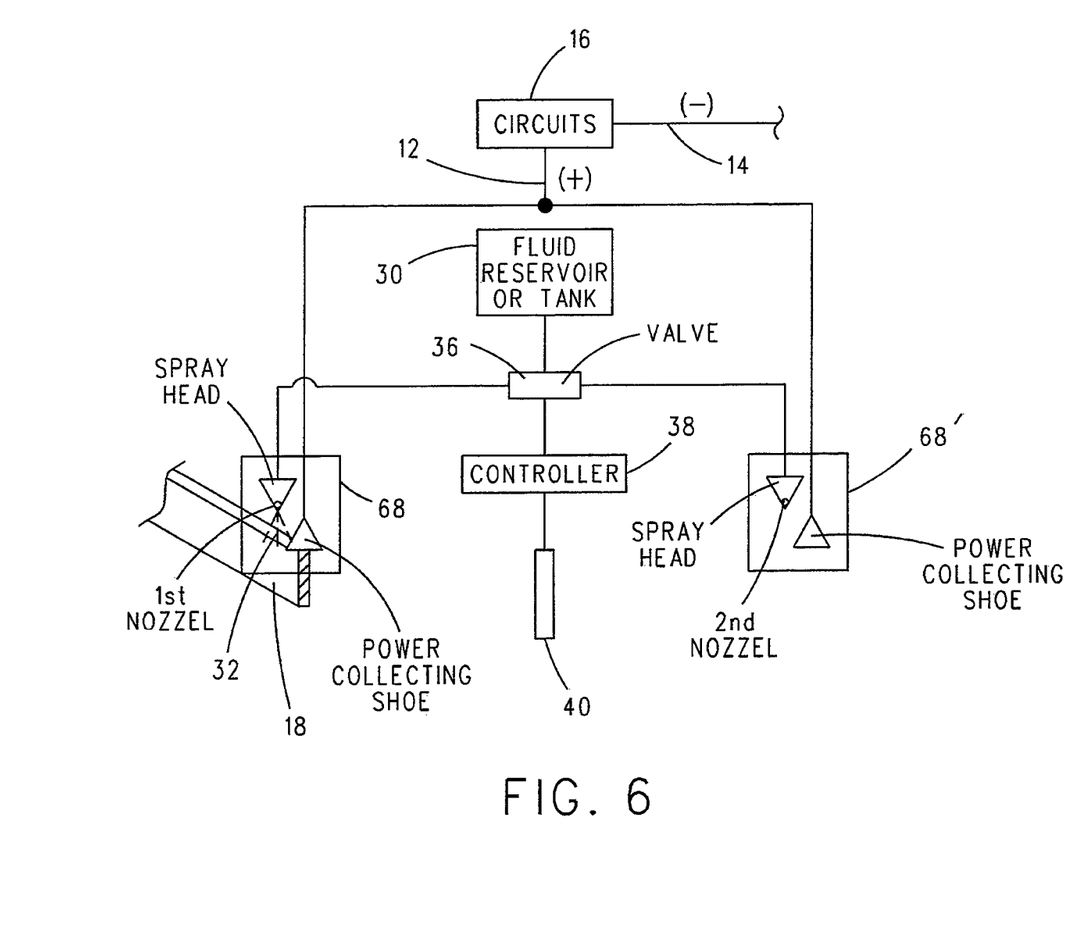
FIG. 6 is a schematic view of, among other things, one or more combination power collecting shoes/spray heads coupled to a valve.

In FIGS. 3, 4, and 5B, spray head 34 is illustrated as being separate from a power collecting shoe. However, this is not to be construed in a limiting sense since it is envisioned that each spray head 34 and power collecting shoe 20 can be replaced with a combined power collecting shoe/spray head 68 shown, for example, schematically in FIG. 6. Similarly, power collecting shoe 20' and a spray head 34 in FIG. 4 can be replaced with a combined power collecting shoe/spray head 68' shown also in FIG. 6. In this example, valve 36 can be a multi-way valve that operates under the control of controller 38 to dispense fluid 32 via the combination power collecting shoe/spray head 68 or the combination power collecting shoe/spray head 68', or to withhold the dispensing of fluid altogether.

The embodiments have been described with reference to various examples. Modifications and alterations will occur to others upon reading and understanding the foregoing examples. Accordingly, the foregoing examples are not to be construed as limiting the disclosure.

The invention claimed is:

1. A mass transit vehicle comprising:
a first power collecting shoe configured to contact a power rail disposed along a pathway and to deliver electrical power from the power rail to one or more electrical circuits of the mass transit vehicle as the mass transit vehicle moves along the pathway;
a fluid reservoir;
a controller operative for automatically causing a fluid in the fluid reservoir to be provided to or withheld from the power rail based on positions of the mass transit vehicle on the pathway;
a second power collecting shoe, wherein the first and second power collecting shoes are disposed on respective first and second sides of the mass transit vehicle; and
a sensor operative for detecting the presence or absence of contact between the power rail and the first power collecting shoe or the second power collecting shoe and for providing to the controller an indication of said presence or absence of contact, wherein:
the controller is responsive to said indication for causing the fluid to be provided solely to a side of the vehicle where the power rail is contacted by the first power collecting shoe or the second power collecting shoe and for causing the fluid to be withheld from the other side of the vehicle.

2. The mass transit vehicle of claim 1, wherein:
the fluid is an anti-icing fluid;
the fluid is withheld from the power rail at a covered position on the pathway; and
the fluid is provided to the power rail at an uncovered position on the pathway.

3. The mass transit vehicle of claim 1, further including a GPS receiver, wherein the controller is operative for automatically causing the fluid to be provided to or withheld from the power rail based on GPS coordinates output by the GPS receiver.

4. The mass transit vehicle of claim 1, wherein:
the mass transit vehicle includes a plurality of cars connected in series; and
the fluid is provided to the power rail from a car at one end of the plurality of cars.

5. The mass transit vehicle of claim 1, further comprising a spray head, wherein the fluid is provided to the power rail via the spray head.

6. The mass transit vehicle of claim 5, wherein the power collecting shoe comprises the spray head.

7. A mass transit vehicle comprising:
a first power collecting shoe configured to contact a power rail disposed along a pathway and to deliver electrical power from the power rail to one or more electrical circuits of the mass transit vehicle as the mass transit vehicle moves along the pathway;
a fluid reservoir;
a controller operative for automatically causing a fluid in the fluid reservoir to be provided to or withheld from the power rail based on positions of the mass transit vehicle on the pathway; and
a first sensor operative for acquiring data from a marker on the pathway, wherein the controller automatically provides or withholds the fluid from the power rail based on the acquired data.

8. The mass transit vehicle of claim 7, further including a second sensor operative for outputting a signal related to a distance traveled or a velocity of the mass transit vehicle.

9. The mass transit vehicle of claim 8, wherein the second sensor is operative for outputting a signal related to rotational movement of a wheel of the mass transit vehicle.

10. The mass transit vehicle of claim 8, wherein:
the controller processes the output of the second sensor during movement of the mass transit vehicle on the pathway to determine a distance the mass transit vehicle travels; and
the controller is operative for automatically providing or withholding the fluid from the power rail in response to determining that the mass transit vehicle has traveled a predetermined distance from the marker on the pathway.

11. The mass transit vehicle of claim 10, wherein:
the marker is at an uncovered position on the pathway where the controller automatically provides the fluid to the power rail and the predetermined distance from the marker is a covered position on the pathway where the controller automatically withholds the fluid from the power rail; or
the marker is at a covered position on the pathway where the controller automatically withholds the fluid from the power rail and the predetermined distance from the marker is an uncovered position on the pathway where the controller automatically provides the fluid to the power rail.

12. The mass transit vehicle of claim 10, wherein the predetermined distance includes a distance added to the position of the marker on the pathway.

13. The mass transit vehicle of claim 12, wherein the predetermined distance further includes a distance between a position of the first sensor on the mass transit vehicle and a position on the mass transit vehicle where the fluid is provided to the power rail.

14. A method of automatically providing or withholding fluid from a power rail for a mass transit vehicle, the method comprising the steps of:
(a) during movement of a mass transit vehicle on a pathway in an uncovered (or exposed) area of the pathway, automatically causing fluid to be provided to (or dispensed on) a power rail supplying power to the mass transit vehicle; and
(b) during movement of the mass transit vehicle in a covered area of the pathway, automatically causing the fluid to be withheld from (or not dispensed on) the power rail, wherein the method further includes:
(c) automatically changing from causing the fluid to be provided to the power rail to causing the fluid to be withheld from the power rail based on movement of the mass transit vehicle from the uncovered area of the pathway to the covered area of the pathway, respectively; or
(d) automatically changing from causing the fluid to be withheld from the power rail to causing the fluid to be provided to the power rail based on movement of the mass transit vehicle from the covered area of the pathway to the uncovered area of the pathway, respectively,
wherein at least one of step (c) and (d) occurs in response to determining that the mass transit vehicle has traveled a predetermined distance on the pathway from a marker associated with the pathway.

15. The method of claim 14, wherein at least one of step (c) and (d) is based on GPS coordinates of a GPS receiver of the mass transit vehicle.

16. The method of claim 14, wherein the predetermined distance further includes a distance from a marker sensor on the mass transit vehicle and a position on the mass transit vehicle where the fluid is dispensed.

17. The method of claim 14, further including:

detecting the presence of the power rail on a first side of the mass transit vehicle or a second side of the mass transit vehicle; and during step (a), causing the fluid to be dispensed solely on the first side or the second side of the mass transit vehicle based on the detected presence of the power rail on said first side or said second side of the mass transit vehicle.

* * * * *